United States Patent [19]

Hertzberg et al.

[11] 3,998,711
[45] Dec. 21, 1976

[54] METHOD FOR CONTINUOUSLY CARRYING OUT A GAS PHASE REACTION AND APPARATUS THEREFOR

[75] Inventors: Abraham Hertzberg; Walter Christiansen, both of Bellevue, Wash.

[73] Assignee: Mathematical Sciences Northwest, Inc., Bellevue, Wash.

[22] Filed: Nov. 28, 1975

[21] Appl. No.: 635,930

[52] U.S. Cl. .................. 204/157.1 S; 204/193; 423/407; 423/659
[51] Int. Cl.² ............... B01J 1/12; C01B 21/16
[58] Field of Search ............ 204/157.1 S; 423/407, 423/659; 204/193

[56] References Cited
UNITED STATES PATENTS 2,832,666   4/1958   Hertzberg et al. ............... 423/407

Primary Examiner—Howard S. Williams
Attorney, Agent, or Firm—Graybeal, Barnard & Uhlir

[57] ABSTRACT

A method for continuously carrying out the chemical synthesis of a gas in a wave reactor apparatus of the type wherein reactant gases subjected to compression waves generated by a driver gas may be heated to extremely high temperatures very rapidly and then cooled at extremely rapid rates with very precise control over reaction parameters. The method includes the step of removing the exhaust driver gas from the tubes of the wave reactor at a pressure greater than that which it had upon entering the tubes of the wave reactor prior to compression of the reactant. The driver gas is recirculated without the addition of heat or pump work other than that originating with the reactant gas stream. Apparatus for performing the above method is disclosed including a multi-tube rotor of novel physical dimension and a conduit and manifold system for recirculating the driver gas between tubes of the wave reactor. Particularly disclosed is a conduit and manifold system for staged recirculation of the driver gas.

27 Claims, 7 Drawing Figures

REACTANT — ▓▓▓▓
DRIVER IN — ▨▨▨▨
DRIVER OUT — ▥▥▥▥
REACTANT — ▧▧▧▧
PRODUCT

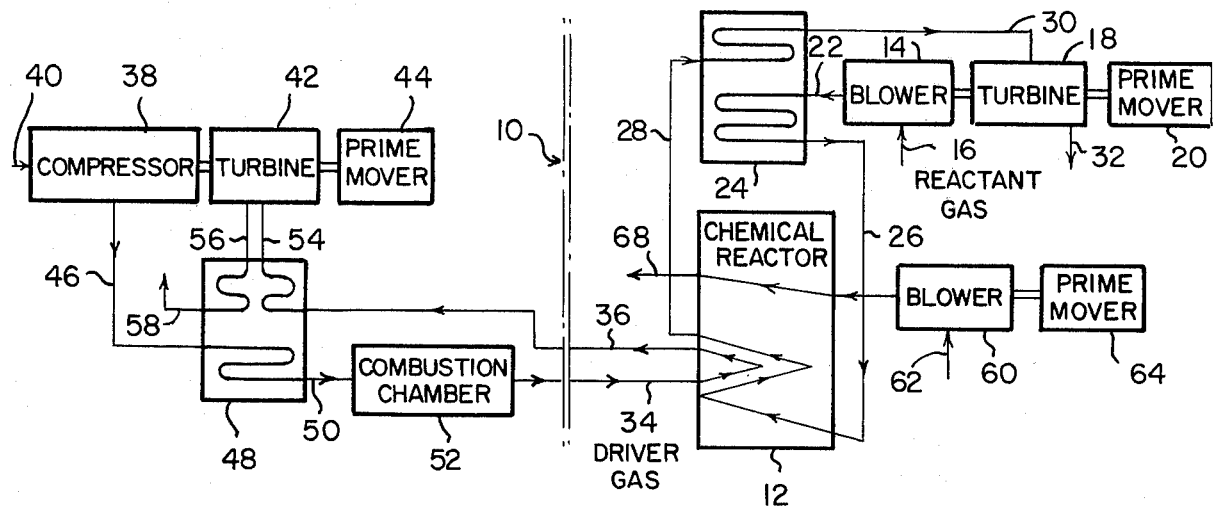
FIG. 1
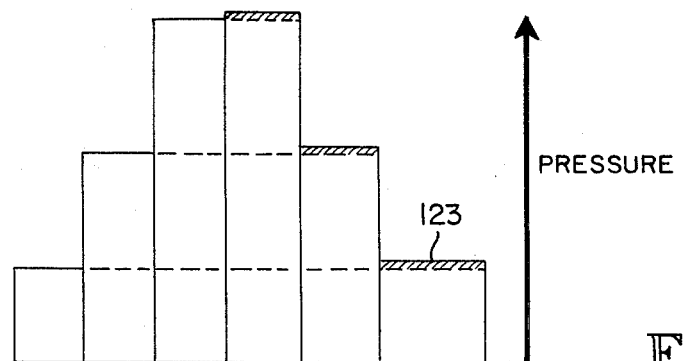
FIG. 4
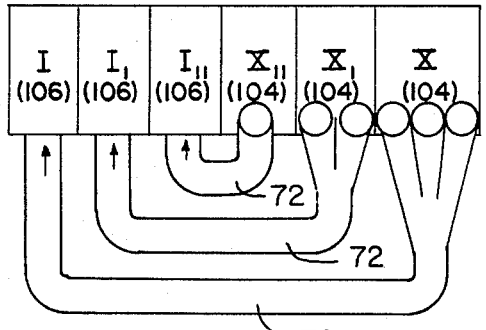
FIG. 2
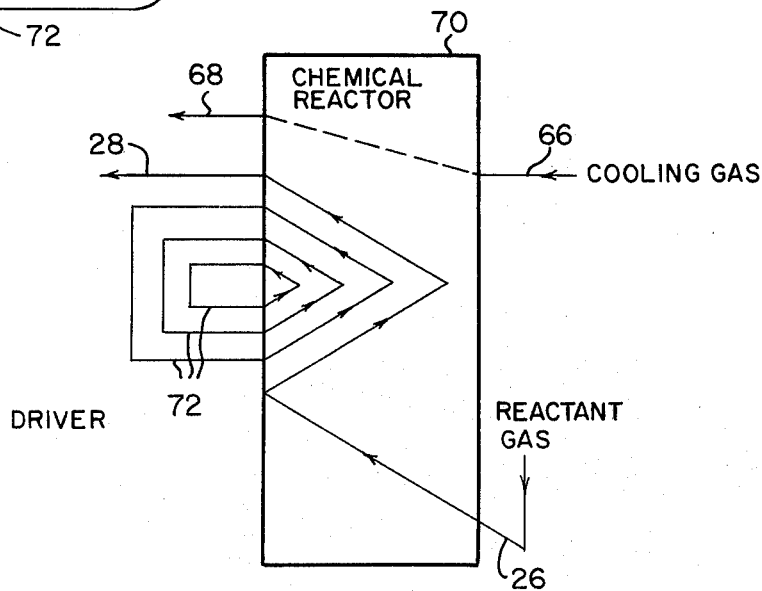

REACTANT —
DRIVER IN —
DRIVER OUT —
REACTANT —
 PRODUCT

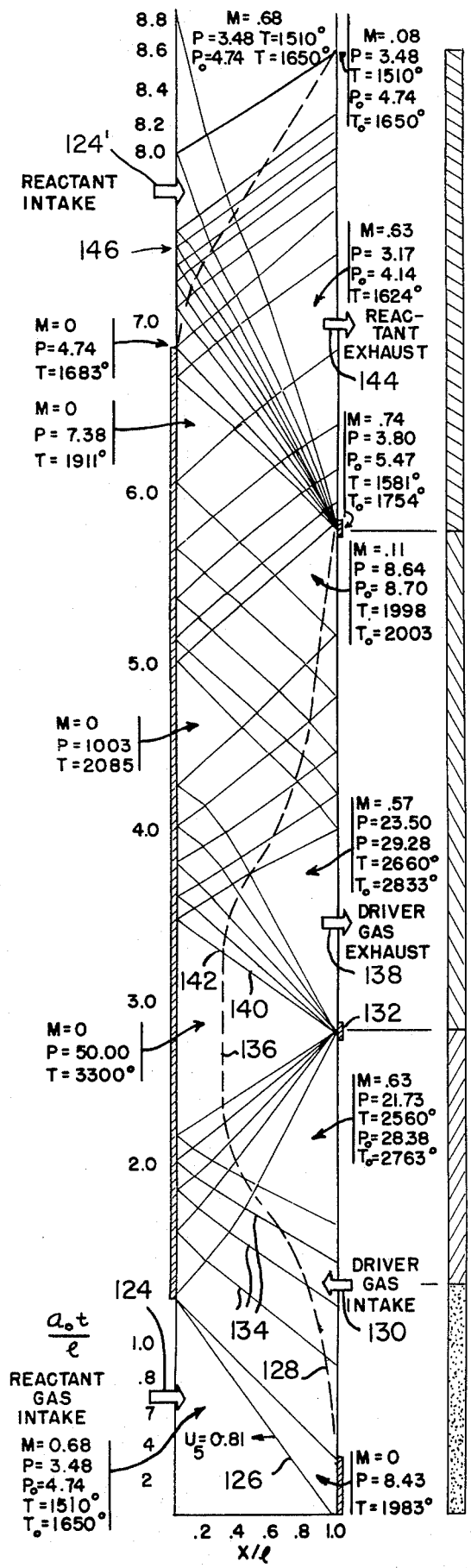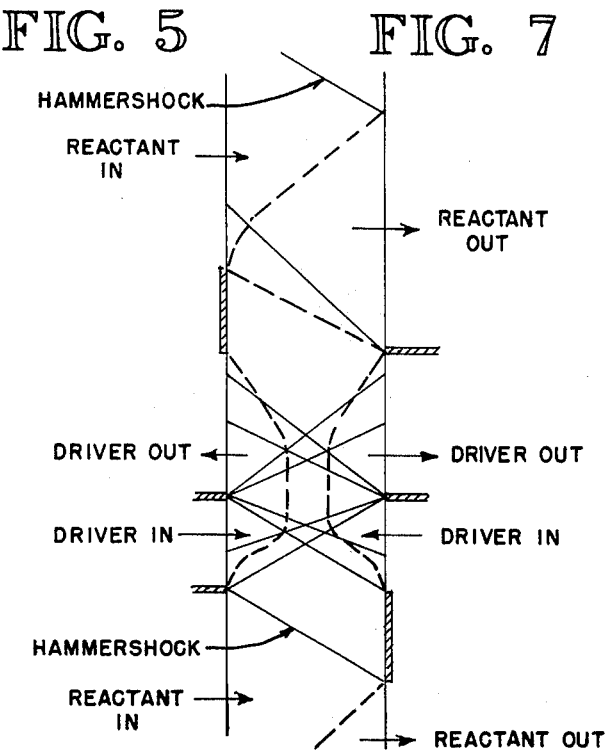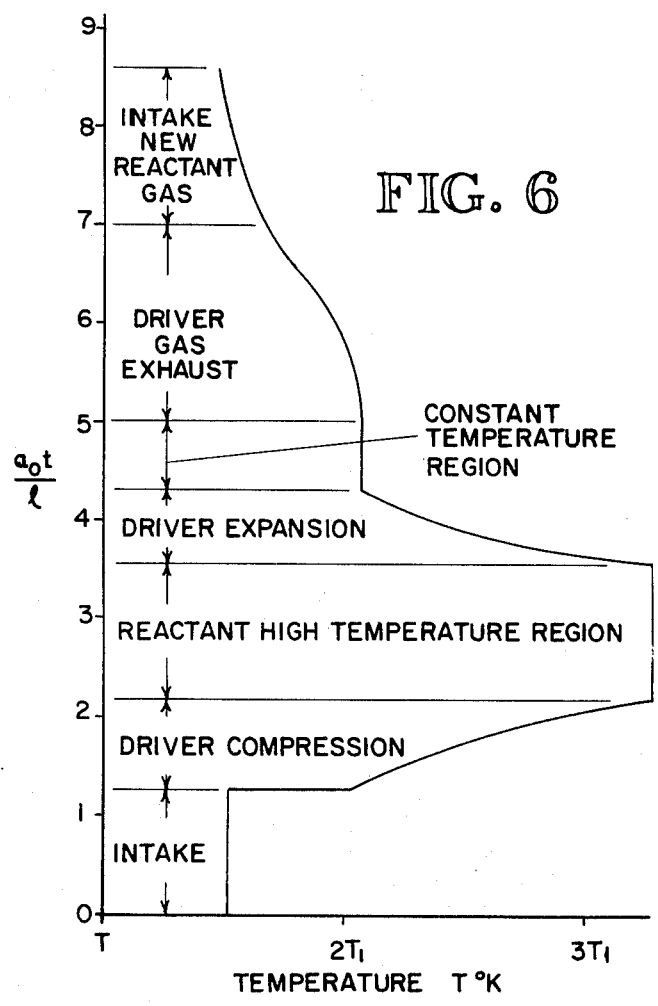

METHOD FOR CONTINUOUSLY CARRYING OUT A GAS PHASE REACTION AND APPARATUS THEREFOR

BACKGROUND OF THE INVENTION

1. Field of the Invention

This invention relates, in general, to a method and apparatus for continuously carrying out a gas phase reaction, and in particular, to an improved method and wave reactor apparatus for chemically synthesizing gases by subjecting them to compression and expansion waves.

2. Description of the Prior Art

The wave reactor is a relatively simple device in which gases are made to react with one another in a continuous manner by application of compression and expansion wave techniques. The unique characteristic of compression and expansion wave technology is that the gas which is subjected to the waves may be heated to extremely high temperatures very rapidly, and then cooled at extremely rapid rates with very precise control over reaction parameters. For industrial utilization, an ideal high-temperature chemical reactor must raise the reactant gas to the required reaction temperatures and cool the high temperature products fast enough so that there will be a minimum of product lost during the cooling process while at the same time minimizing circulating power losses and initial capital investment.

The background of the present invention may best be described with reference to one particular chemical reaction which may be carried out in accordance with the instant invention, namely, the fixation of nitrogen, hereafter simply termed NO, from air. Once nitrogen has been fixed as NO, the succeeding steps to the creation of nitric acid are relatively straightforward. Nitric acid is a well-established feedstock in fertilizer production. For example, the treatment of readily available limestone with nitric acid leads to the formation of "Norwegian Saltpeter", or, the treatment of ammonia leads to the creation of ammonium nitrate often considered one of the most useful forms of high concentration fertilizer. During World War I the Haber method of direct fixation of nitrogen was developed whereby nitrogen was combined with hydrogen under extreme pressures to form ammonia. With the birth of the great petroleum boom in the United States in the early post World War I years, the use of natural gas as a feedstock for the chemical industry was quickly exploited due to the ease with which natural gas could be used. In particular, methane was a source of cheap hydrogen, one of the chief requirements for the production of Haber ammonia.

By the end of World War II, the agriculture-chemical fertilizer industrial complex based on the Haber process had grown to the point where the United States was able to create a substantial oversupply of food. The combination of the progressively dropping price of fertilizer and the progressively sophisticated development of hybrid grains, particularly corn, appeared able to continue without limit. Nevertheless the alternative approach of fixing nitrogen from air, was pursued by a few visionaries, most notably Farrington Daniels. Daniels' concept involved heating air in a regenerative heat exchanger followed by a rapid quench to create high volumes of low concentration NO. Daniels' approach, however, was doomed to failure due to the technical limitations of the high temperature pebble-bed heater which he used and to the nearly violent expansion of the natural gas industry resulting in the creation of a market for natural gas in which this valuable and limited resource was literally given away at prices far below its equivalent energy value. It became clear that even for the production of nitric acid, Harber ammonia would compete economically with nitric acid produced from the fixation of air by the Farrington Daniels' approach and support for the Farrington Daniels' approach was withdrawn.

Between 1950 and 1960 the science and technology of high-energy gasdynamics was a fallout of the scientific developments created during World War II. Among these was the shock tube which presented to the scientists a convenient tool for the study of high temperature gas properties. A group at Cornell Laboratory which was involved in the study of nonsteady gasdynamics exhibited in shock tube type devices, began a serious set of investigations into the structure and nature of air at high temperatures. It was quickly realized by this group that at high temperatures, strong concentration of NO could be achieved directly by shock heating of gases. The concentrations, depending on the temperature, would easily exceed that of the heater reactor of Farrington Daniels and under optimal conditions could approach 5%. This possibility led to the development by this group of the device called the "chemical shock tube" which was specifically designed to create high temperature pulses in order to study the kinetics of the formation of NO as well as the necessity and appropriate mechanisms for retaining the equilibrium concentrations. Apparatus was designed and constructed for carrying out the gas phase reactions on a continuous basis, the apparatus designed being based in part upon a new class of machinery called the "comprex" which had been developed by Seippel as a device for improving the efficiency of gas turbine machinery. See Seippel U.S. Pat. No. 2,399,394. Abraham Hertzberg, one of the coinventors of the present invention, was personally involved in the work at Cornell and U.S. Pat. Nos. 2,832,666, 2,902,337, 2,930,196, 3,326,452 and 3,367,563, as well as Paper No. 66-GT-117 of the "Journal of Engineering for Power," substantially describe the nature and results of that work.

To summarize, the Cornell group conceived of a wave reactor apparatus which was designed to use compression forces generated therein to superheat a reactant gas, maintain the high temperature of the gas long enough to promote equilibrium formation and then suddenly cool the mixture by rapid expansion to preserve the desired equilibrium. By programing the wave processes, the apparatus was designed to recover as much of the desired reaction product as possible, consistent with the gasdynamics and working capability of machinery available at that time. In an NO formation reaction, the reacted air which had completed the high temperature portion of its cycle in the wave reactor left the reactor enriched with NO and was then further cooled by a regenerative heat exchanger. The driver cycle which carried out the function of a piston to compress the reactant gas was basically a system similar to that shown at the left-hand side of the broken lines 10 in FIG. 1 of this application as will be discussed in more detail hereinafter. In that system all make-up work was supplied by shaft power purchased off the line in the most convenient manner. This cycle proved to suffer from a number of dificiencies which led to excessive energy and capital requirements. In particular, the compressor and turbine components of the driver resulted in large circulating power losses and excessive capital investment. Nevertheless, this was a significant step beyond the Farrington Daniels' approach.

In a related project at Cornell, a large scale superheater facility was constructed which included a five foot diameter rotor drum with 288 individual shock tubes arranged around the circumference. This apparatus processed about five pounds of air per second at temperatures in excess of 4500° K and is additionally discussed in the following articles:

W. E. Smith and R. C. Weatherston, "Studies of a Prototype Wave Superheater," CAL Report No. HF-1056-A-1, AFOSR TR 58-158 AD 207244, December, 1958;

A. H. Flax, A. Hertzberg, and W. E. Smith, "A New Method for Providing Continuous High-Temperature Airflow for Hypersonic Research," CAL Report No. 79, AFOSR TN 56-236, May, 1956;

R. C. Weatherston, W. E. Smith, A. L. Russo, and P. V. Marrone, "Gasdynamics of a Wave Superheater Facility for Hypersonic Research and Development," CAL Report No. AD-118-A-1, AFOSR TN 59-107, February, 1959; and J. Carpenter, "Engineering Design of a Wave Superheater Facility for Hypersonic Research and Development," CAL Report No. AD-1118-A-2, AFOSR TN 59-108. February, 1959.

Also of interest to the present invention are Hansel U.S. Pat. Nos. 3,272,598 and 3,254,960 and Hansel et al. U.S. Pat. No. 3,307,917 which disclose the heating and rapid cooling of gases other than air in a continuous flow shock tube process and the use of alternate drivers such as hydrogen to reduce the circulating power requirement.

In accordance with the instant invention, substantial process, method and apparatus improvements have been made in the above described wave reactor approach whereby both the circulating power and capital cost structure are radically improved.

BRIEF SUMMARY OF THE INVENTION

While the above described combustion driven wave reactor system was a significant step leading to the development of a chemical process whereby a reactant gas could be subject to high reaction temperature and rapid cooling, this system was too complicated and inefficient to be adapted to large scale industrial uses. As applied to nitrogen fixation in particular, the complexities and inefficiencies have prevented this technique, prior to the instant invention, from being competitive with other known nitrate formation techniques. Examination has indicated that losses associated with the driver gas in a wave reactor apparatus were particularly serious. For example pumping losses alone in bringing a driver gas such as air up to the pressure required in the fixation of nitrogen, cycling it through the reactor and then reexpanding it through a turbine, proved to involve energy requirements which virtually eliminated this system from consideration on the basis of energy demands alone. In accordance with the instant invention, it has been found that in a wave reactor system the driven gas may be removed at higher total pressures than it had upon entering the reactor. In particular, the driver gas may be removed and recirculated in stages of differing total pressures with the exit pressure of the gas being greater in each stage than the entrance pressure of the same stage.

In one disclosed embodiment, the driver system no longer involves the necessity of a pump, a compressor, or an expander system and acts only as an effective fly wheel to store the energy required for the driver gas. In the present invention the role of the driver gas and the reactant gas may in one aspect be said to be interchanged since the driving energy for the system now comes from the reactant gas while in prior art wave reactor systems the driver gas usually supplied excess energy to the reactant system. Stated somewhat differently, all energy required to drive the disclosed system comes from a pressure drop in the reactant gas flowing through the system and the driver gas system may be considered simply as an idling fly wheel which first extracts and then returns its energy to the system. All friction losses are made up by the pressure drop of the reactant gas flowing through the reactor.

A significant characteristic of the present invention, when applied to the production of NO, lies in the dryness of the end product. The dry end product realized is significantly different from the NO produced by the burning of ammonia, and permits the plant designer to choose from a wider variety of product separation processes.

BRIEF DESCRIPTION OF THE DRAWINGS

FIG. 1 is a flow chart of a prior art process for continuously carrying out a gas phase reaction in a wave reactor which requires a high temperature to promote the reaction and rapid cooling to preserve the reaction product, including broken lines indicating that portion of the apparatus not needed for performance of the method of the present invention.

FIG. 2 is a diagram of the chemical reactor portion of the flow diagram of FIG. 1 illustrating the recirculation of the driver gas in accordance with the present invention.

FIG. 4 is a partially schematic, partially graphic diagram illustrating one embodiment of a staged recirculation system for the driver gas including a pressure diagram illustrating the relationship between exit and entrance pressure in each stage and between stages.

FIG. 5 is a diagram illustrating the interaction of the various waves developed in the reactor of FIG. 3 during a typical gas phase reaction, the abscissa of this diagram representing the axial distance along the length of the reactor tubes, and the ordinate representing a portion of the developed circumference of the chemical reactor and also time.

FIG. 6 is a diagram illustrating the reactant gas temperature history plotted along the left-hand side of the diagram of FIG. 5 during a typical gas phase reaction carried out in accordance with the present invention.

FIG. 7 is a diagram illustrating the interaction of the various waves developed during a typical gas phase reaction carried out in accordance with the instant invention in a reactor of the double ended type wherein compression of the reactant is carried out in the central portion of the reactor tubes in response to the simultaneous introduction of opposing pairs of compression waves at opposite ends of the tubes.

DETAILED DESCRIPTION OF THE INVENTION

Figure 3:
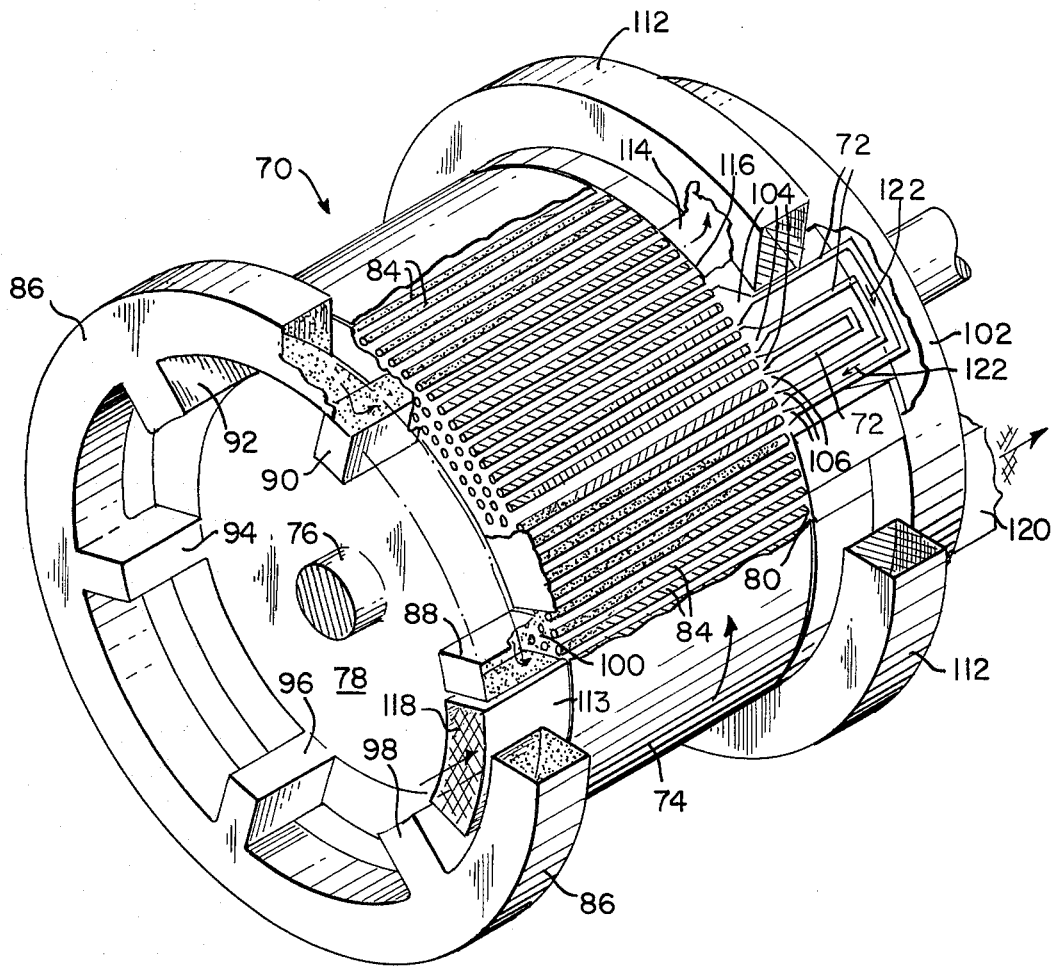
FIG. 3 is a perspective view of a chemical reactor constructed in accordance with the instant invention with a portion of the rotor being broken away to illustrate the tubes therein, and with hatched lines being provided to portray the movement of the driver and reactant gases within the tubes during processing.

In general, a gas phase reaction is carried out in accordance with the present invention by introducing the reactant gas into the upstream end of a chamber or reactor tube of a chemical reactor apparatus to be described hereafter, the introducing at the appropriate time a pulse of pressurized driver gas into the downstream end of the chamber or reactor tube whereby a compression wave and also a fan pattern of expansion waves are generated which propagate upstream through the reactant gas. Passage of the compression wave through the reactant gas toward the upstream end of the chamber or reactor tube raises the reactant gas to reaction temperature and the subsequent passage of the expansion waves through the reactant gas cools the same rapidly so as to preserve the reaction product. The compression wave and expansion waves are successively reflected near the upstream end of the chamber or reactor tube whereby the driver gas is first expelled from the downstream end of the chamber or reactor tube and then the reaction product is thereafter expelled or scavenged from the downstream end of the reactor tube means. In accordance with the instant method and apparatus, as will be described more completely hereafter, the total inlet pressure of the driver gas is less than the total outlet pressure of the driver gas and thus in one embodiment, the driver gas may be recirculated from tube to tube of the chemical reactor without the input of pump work. In another alternative embodiment, pump work may be added to the exhausted driver gas, however the pump work is generated from the reactant gas stream.

It will be recognized that FIG. 1 is substantially the same as FIG. 1 of U.S. Pat No. 2,832,666, additionally however, broken lines 10 have been added to the drawing to illustrate the equipment savings provided by the instant invention as compared with typical prior art equipment. U.S. Pat. No. 2,832,666 discloses the basic theory and operation of a wave reactor apparatus and thus applicants hereby incorporate the disclosure of this patent by reference in this application. For like reason applicants also incorporate herein by reference the disclosure of U.S. Pat. No. 2,902,337 which discloses the basic theory and operation of what may be termed a "double ended" wave reactor apparatus where compression of the reactant gas is carried out centrally in the reactor tubes rather than adjacent a sealed end of a reactor tube. While the present invention is described hereafter primarily with respect to a wave reactor generally of the type disclosed in the 2,832,666 patent, it will be understood that the present invention may also be carried out through use of so-called double ended type reactors.

In FIG. 1, reactant gas, the composition of which may vary depending upon the chemical reaction intended to be carried out within the chemical reactor 12, enters blower 14 through reactant gas inlet line 16. The blower 14 may be of any suitable type and is shown as being driven by a turbine 18, which is in turn partially driven by a prime mover 20. The turbine 18 and the prime mover 20 may be of any conventional type suitable for the described purpose.

The reactant gas leaves the blower 14 through line 22 and is conducted thereby to a heat exchanger 24 which also may be of any suitable conventional type. In passing through the heat exchanger, the reactant gas picks up heat and is then conveyed through line 26 to a reactant gas inlet area of the chemical reactor 12. The reactant gas inlet area is arranged at the end of the chemical reactor 12 opposite the end at which the driver gas inlet and outlet areas and the reaction product outlet areas are located.

It will be understood that where the reactant gas to be processed is air, it may be desired to place additional apparatus in the reactant gas flow line prior to its entering chemical reactor 12 to remove water vapor from the air. While the term "dry" is used in the present application to describe the fact that the process carried out in accordance with the present invention adds no additional moisture to that found in ambient air, with proper treatment the reactant air can be made totally or near totally dry, thus producing totally or near totally dry reactant products including NO.

After the preheated reactant gas is processed within the chemical reactor 12 the processed reactant gas is discharged from the chemical reactor into the reactant product outlet line 28 which conducts the heated reactant product to the heat exchanger 24 through which it flows and in so doing gives up some of its heat to the reactant gas passing from the blower 14 to the reactor 12. The cooled reactant product gas leaves the heat exchanger through line 30 and is conducted to turbine 18 where is serves to partially drive the turbine and then exits through discharge line 32. The reactant product gas discharged through line 32 is reclaimed in any suitable manner and by any suitable apparatus for making the most effective use of the reactant products resulting from the chemical reaction carried out within the chemical reactor 12.

In prior art apparatus, the driver gas which enters reactor 12 through line 34 and exits through discharge line 36, itself required substantial compression and heating prior to its use to compress the reactant gas within the reactor. FIG. 1 from U.S. Pat. No. 2,832,666 contemplates the products of combustion between air and hydrocarbon fuel as the driver gas. Air enters a compressor 38 through inlet line 40, the compressor being suitably driven by a turbine 42 which is in turn partially driven by a prime mover 44 the compressed air discharged from the compressor is carried by line 46 to a heat exchanger 48 and the compressed and heated air leaving the heat exchanger is conducted by line 50 to combustion chamber 52. In the combustion chamber the heated and compressed air and fuel mixture is combusted in a suitable manner to provide a hot, compressed driver gas which is conducted by line 34 to the driver gas inlet area of chemical reactor 12. After the driver gas is discharged from the chemical reactor it is carried by line 36 back to the heat exchanger, and thence by line 54 to the turbine, back to the heat exchanger through line 56, and is finally discharged to the atmosphere through line 58.

In both the apparatus of the instant invention and that of prior art wave reactors a cooling gas may be passed through the reactor to lower the temperature levels of the reactor tubes although it will be understood that in some instances the reactor may be advantageously operated without extenal cooling. If cooling is desired, the cooling gas may be air drawn from the atmosphere into a blower 60 through intake line 62 (FIG. 1). Blower 60 may be driven by any suitable prime mover 64. Air discharged by the blower is conducted through line 66 to the cooling gas inlet area of the chemical reactor and is then exhausted to the atmosphere through exhaust line 68 after passing through the reactor tubes.

Referring now to FIG. 2, a chemical reactor 70 constructed and operated according to the instant invention is disclosed in diagram form to illustrate the continuous circulation of the driver gas through the reactor without the addition of heat or pump work. As will be discussed more completely hereafter with reference to FIGS. 3 and 4, in the illustrated embodiment the driver gas stream includes a plurality of conduit members 72 which conduct portions of the exhaust driver gas from tubes of the chemical reactor which have moved adjacent the exhaust nozzle opening associated with the conduit member to other reactor tubes of the rotating reactor disc which have moved adjacent an inlet nozzle at the distal end of the conduit. The embodiment illustrated employs three conduits to recirculate the driver gas in three discrete stages, but it will be understood that a greater or lesser number of recirculation stages may be employed to produce maximum efficiency depending on the nature of the reaction products and other variables. It will be further understood that the reactor 70 of FIG. 2 may be substituted for the reactor 12 of the portion of FIG. 1 to the right of broken lines 10 to produce a flow diagram representing the method and apparatus of the present invention. The instant invention thus provides not only capital cost savings through the elimination of the driver gas prime mover, turbine, compressor, heat exchanger and combustion chamber shown to the left of broken lines 10 in FIG. 1, but of equal or greater importance, also provides a method and apparatus of increased efficiency in that the losses which are necessarily associated with the eliminated equipment are avoided.

FIG. 3 illustrates a rotary wave reactor 70 constructed in accordance with the instant invention including a cylindrical member 74 rotatable on a shaft 76 and two stationary wall members 78 and 80 positioned adjacent the opposite ends of the rotatable cylindrical member 74 and adapted to intermittently seal the open ends of tubes 84 in a manner described hereafter. The rotatable cylinder 74 has a plurality of open ended tubes 84 oriented parallel to shaft 76 and positioned around the periphery of the cylinder. Tubes 84 are shown as being circular in cross-section but it will be understood that tubes of other shaped cross-section may also be used. The tubes may be formed by any conventional means such as by drilling or casting.

While it will be understood that this invention is not intended to be limited to the carrying out of any particular chemical reaction, for illustrative purposes the invention will be described hereafter with respect to the earlier discussed process for the fixation of nitrogen from air employing air as a driver gas. It is understood driver gases other than air such as nitrogen, hydrogen or steam, may also be used advantageously in the present invention for the fixation of nitrogen from air, however the use or steam as a driver may require the further use of a buffer gas such as nitrogen between the driver and the reactant gas to prevent contamination of reactant gas by water vapor or other undesirables.

Reactant (air) inlet manifold 86 is shown positioned adjacent stationary wall member 78. Reactant air inlet areas 88, 90, 92, 94, 96 and 98 interconnected with manifold 86, are shown spaced around the periphery of stationary wall member 78. The reactant air inlet areas may include inlet nozzles adapted to lead reactant air from the inlet manifold through openings such as 100 in wall member 78 through which reactant air enters the upstream end of tubes 84 as they are rotated thereby. It will be understood that a conventional reactant air heating and pressurizing system such as that discussed earlier with respect to FIG. 1 may be employed to provide air to inlet manifold 86.

Driver gas recirculation system 102 is disclosed adjacent stationary wall member 80 at the opposite downstream end of the reactor tubes. Recirculation system 102 includes the earlier discussed conduits 72 communicating between exhaust nozzles 104 and inlet nozzles 106. Conduits 72 carry the driver gas from exhaust nozzles 104 to inlet nozzles 106 where the gas passes through an opening in stationary wall 80 into the open ends of tubes 84 as they pass rotatably thereby.

Reaction product (depleted air + nitric oxide) outlet manifold 112 is also positioned adjacent stationary wall 80 and includes conduits 114 adapted to lead the gaseous reaction product from an opening 116 in stationary wall member 80 to outlet manifold 112. It will be understood that the reaction product may be withdrawn from manifold 112 and processed in any desired manner and that the heat may, if desired, be withdrawn therefrom in a heat exchanger or turbine as shown in FIG. 1 (at 24).

Reactor 70 of FIG. 3 also includes a cooling stage for tubes 84 comprising conduit 118 through which cooling air is led to an opening 113 in stationary member 78 through which the cooling air enters the tubes 84 and is exhausted through a like opening (not shown) in wall 80 at the opposite ends of the tubes and thence to the atmosphere through conduit 120. As stated heretofore, the cooling stage may be omitted from operation of the unit if desired.

In a typical air compression process in accordance with this invention, a preheated reactant gas is introduced into the "left" or "upstream" end of tubes 84 of FIG. 3. As the wave reactor rotor rotates, a heated driver gas is introduced into the downstream end of the same tubes 84 to compress and heat the reactant gas. The driver gas is then exhausted from the downstream end of the tube 84 at a pressure higher than its entrance pressure into the tubes 84 while the reactant gas is expanded and cooled. The exhausted driver gas is then circulated into the downstream end of others of the tubes 84 in a manner such that the driver gas enters these second tubes at the same pressure as it had upon entering the first tubes 84. Finally, the reactant products are exhausted from the downstream ends of the first tubes 84.

As illustrated, the reactor apparatus 70 is designed to carry out six air compression processes within each of the reactor tubes during one revolution of rotor 74. Considering only a single compression process, as each of the tubes 84 pass the reactant gas inlet 88 the reactant gas to be subjected to the heating and cooling cycle passes into the tubes 84 through the opening 100. As member 74 rotates, the opposite downstream end of each tube 84 passes inlet nozzles 106 through which high pressure driver gas is introduced into the tube. As disclosed with respect to the selected embodiment of the invention discussed herein, the driver gas enters each of tubes 84 in three stages, although it will be understood that the driver may be introduced in a greater or lesser number of stages if desired. The impact of the high pressure driver gas upon the reactant gas generates compression waves which travel from right to left in FIG. 3 through the column of reactant gas in tube 84 toward stationary wall member 78 and are reflected back toward the downstream end of the tube. In the meantime, the downstream end of the tube has rotated beyond the driver gas inlet nozzles whereby the flow of driver gas into the tube is cut off. Cutting off the driver gas flow generates an expansion wave which follows the compression waves through the tube and is also reflected back toward the downstream end of the tube. The combined effect of the expansion waves and the reflected compression wave moves the driver gas back out ot the tube which has now rotated adjacent the driver gas exhasut nozzles 106. Removal of the driver gas allows the reactant product gas to expand to the original volume of the reactant in the tube. Further rotation of the tube brings the downstream end of the tube adjacent outlet 114 which allows the reactant product gas to flow out of the tube. As illustrated by arrows 122, the driver gas is exhausted from tubes 84, enters conduits 72 through nozzles in exhaust areas 104 and is recirculated through conduits 72 directly back to inlet nozzles in inlet areas 106 whence it enters other tubes 84.

While prior art wave superheaters employed a five foot diameter rotor with a top speed of 700 ft/sec, 288 tubes about 66 inches long, and adapted to operate at a pressure of up to 136 atmospheres and reactant air temperatures of up to 8000° R, the requirements of the advanced wave reactor of this invention are much more modest. The apparatus of the instant invention is typically designed for operation with tube lengths of between 10 and 50 cm and maximum gas temperatures of approximately 3300° K. A rotor speed of 700 ft/sec is assumed with a tube length to diameter ratio of approximately 25 which is consistent with present shock tube experience.

A typical wave reactor point design suitable for 100 ton per day $HNO_3$ production and assuming weak shock compression with $\gamma = 1.3$ is as follows:

| | |
|---|---|
| $T_{o_{max}}$ ° K | 3,300 |
| $Po_{max}$ atm. | 200 |
| Temperature Ratio | 3 |
| Length, cm. | 10 |
| Yield, % NO | 4.9 |
| Mass Flow, lbs/sec. | 22.5 |
| $To_{in}$ ° K | 1,100 |
| Inlet Mach No. | 0.4 |
| $P_{in}^{atm.}$ | 2.0 |
| Duty cycle | ⅓ |
| Tube Diameter, cm. | 0.4 |
| No. of Tubes/Rotor | 14,200 |
| Rotor Diameter, cm. | 120 |
| No. of rows | 15 |
| Rotor Speed rpm. | 3,300 |

Recirculation of the driver gas in accordance with this invention may be more clearly understood by reference to FIG. 4. In this figure, the driver gas inlet and exhaust areas associated with a single compression cycle in a tube are represented by rectangles labeled I, $I_1$ and $I_{11}$ (Inlet areas 106) and X, $X_1$ and $X_{11}$ (Exhaust areas 104). FIG. 4 additionally includes in its upper portion a pressure diagram illustrating the reative pressures at the respective inlet and exhaust areas of the reactor tube. As will be seen, the driver gas which enters a reactor tube at I has been conducted there through a conduit 72 from exhaust nozzles located in driver gas exhaust area X. Reference to the pressure diagram illustrates that the pressure of the driver gas is higher at X than at entrance area I, i.e. that the driver gas is removed from the reactor tubes at X at a pressure higher than its entrance pressure into the reactor tubes at area I. This pressure difference, which is shown as the cross-hatched area 123 on the pressure diagram, is provided by energy drawn from the compression and expansion of the reactant gas, and should be of such a size that all pressure losses occurring in the recirculation of the driver are balanced so that the pressure at driver gas inlet area I remains constant without the additoin of work to the recirculating driver outside of the chemical reactor.

FIG. 4 additionally illustrates that the recirculation of the driver gas between exhaust areas $X_1$ and $X_{11}$ and driver gas inlet areas $I_1$ and $I_{11}$ respectively is carried out in substantially the same manner as discussed heretofore with respect to exhaust area X and inlet area I. It will be noted, however, that in the three stage recirculation system which has been chosen for illustration, the total pressures of the stages vary with rspect to each other with pressures progressively increasing from stage I–X through stage $I_{11}$–$X_{11}$. It is presently contemplated that it may be desirable to vary the size of the driver gas exhaust areas 104 and thus driver gas exhaust area X is shown to be somewhat larger than area $X_1$ which is in turn somewhat larger than $X_{11}$.

Again considering an air reactant-air driver nitrogen fixation process as carried out in a chemical reactor of the type shown in FIG. 3, designed in accordance with the point design set forth above, the interrelationship of the variables within the reactant cycle may be examined with respect to the wave diagam shown at FIG. 5 utilizing ideal gas characteristics. The wave diagram of FIG. 5 shows typical characteristics and operating parameters for such a cycle. High pressure reactant air is taken into the reactor from a conventional preheater in a steady flow region shown in the lower left of FIG. 5 at 124 (i.e. 88 in FIG. 3). The inlet Mach number is 0.68 to minimize losses while the inlet pressure of the gas entering the tubes is set at approximately 3.5 atm.

To initiate the cycle, the inlet air may be brought to rest by a weak hammershock indicated by wave line 126 which raises the pressure in the tube and brings the reactant gas completely to rest. The pressurization of the reactant gas is then carried out intil the gas is brought to its final reaction condition. Dashed line 128 indicates the interface between the reactant and driver gases as the process is carried out.

To maximize efficiency, an isentropic compression wave was selected as idea. In reality the equipment may be tuned to closely approximate the ideal. The initial driver inlet velocity (M = 0.63) is such that the leading edge of the compression wave is essentially an acoustic wave. Driver gas enters the system at 130 (i.e. 106 in FIG. 3) and the pressure on the driver inlet side of the tube is raised in time (or in angular location, as the reactor is rotated) to form the family of waves which are reflected and focus at the termination 132 of the driver gas inlet area.

An examination of the pressure history of the gas coming into the tube (84 in FIG. 3) reveals that if the gas is taken to be air and the impedance across the interface 128 is kept constant, i.e. the velocities of sound are maintained equally, the pressure rise from the pressure after hammershock to the final pressure of the reaction gas proceeds in a step-wise manner. In the chemical reactor this pressure development is replicated by a series of focused weak shock waves 134 with little loss of efficiency, i.e. an insignificant entropy rise.

At the end of the reaction cycle, the reactant gas has been compressed and heated to the selected conditions under which the reaction takes place at 136. As illustrated in FIG. 5, considerable reaction dwell time is allowed, but this can be controlled by choosing the point of origin of the cooling expansion waves. After allowing the appropriate time for the reaction to occur, the next phase of the cycle involves a sudden quenching of the reaction and the cooling of the gas. In the illustrated case the expansion wave is initiated by the reactor tube 84 rotating adjacent the driver exhaust areas thus allowing the driver gas to begin flowing out as indicated at 138. This step up an expansion wave 140 which is nearly the reflected image of the previously used compression wave system. Here the wave must, be the nature of the process, also be isentropic.

The wave system then crosses the interface between the reactant product and the driver at 142 and begins to accelerate the reactant product back toward the driver exhaust end of the tube as the driver gas flows out of the tube. As chosen, the driver gas exhaust pressure is slightly above the driver gas inlet pressure thus assuring proper recirculation of the driver without the need for auxiliary pumping. In the system discussed with reference to FIG. 4, the driver gas is self-scavenging with no external assistance, however in some cases some external scavenging assistance may be desirable.

It should be pointed out that in accordance with this invention, and as an alternative to maintaining the driver exhaust pressure at a level higher than the driver inlet pressure, the back pressure of the driver gas may be increased by pump work obtained from the reactant gas stream. In this manner, the driver gas still acts only as a fly wheel driver piston with all energy losses being compensated from the reactant gas stream.

After the driver gas leaves the tube 84, the reactant product is scavenged at 144 (conduit 114 in FIG. 3) at a temperature slightly below the reactant intake temperature at 124 which is set by the maximum temperature allowable without destroying the NO produced. This temperature sets the limits on the process rather than heat exchanger technology. The scavenging process acts automatically to induce an expansion wave system at 146 which is desigend to bring in the fresh charge of reactant as indicated at 124'.

The temperature history of the reactant gas through the process discussed above with reference to FIG. 5 and as measured at the reactant inlet side of the reactor is shown in FIG. 6. In the described case, the reactant and driver were both nominally chosen to be air, but it is contemplated that a lower molecular weight driver may be used advantageously at a corresponding lower temperature.

Referring finally to FIG. 7, a wave diagram is disclosed showing an operating sequence for a double ended wave reactor operating in accordance with the method of the present invention wherein the driver gas is removed from the reactor at a total pressure higher than its entrance pressure. In a reactor of this type compression of the reactant gas is carried out in the central portion of the reactor tubes in response to the simultaneous introduction of opposing paris of compression waves at opposite ends of the tubes. In this manner, compression of the reactant adjacent an end of the reactor tube which must be sealed is avoided. U.S. Pat. No. 2,902,337 discloses one form of double ended reactor and FIG. 7 is provided merely to illustrate that the method of the present invention can be carried out in this manner with avoidance of sealing problems associated with tube end compression.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be included therein.

What is claimed is:

1. A method of rapidly heating and cooling a reactant gas in a wave reactor including the steps of:
   introducing a preheated reactant gas into the upstream end of a first tube means in said wave reactor;
   introducing a heater driver gas into the downstream end of said first tube means at a first pressure to compress and heat said reactant gas;
   exhausting said driver gas from the downstream end of said first tube means at a second pressure higher than said first pressure while expanding and cooling said reactant gas;
   circulating said exhausted driver gas into the downstream end of a second tube means such that said gas enters said second tube means at said first pressure; and
   exhausting said reactant gas from the downstream end of said tube means.

2. The method of claim 1 including the steps of introducing a heated driver gas into and exhausting a heated driver gas from the downstream end of said first tube means of a wave reactor in discrete stages.

3. The method of claim 2 wherein the driver gas is introduced into and exhausted from said first tube means in three stages.

4. The method of claim 2 wherein the steps of introducing a heated driver gas into and exhausting a heated driver gas from the tube means of a wave reactor includes the steps of maintaining the exhaust pressure of said driver gas higher than the introduction pressure of said driver gas in each of said stages.

5. The method of claim 2 wherein the pressure of the driver gas introduced into and exhausted from said first tube means in discrete stages is maintained at differing levels in each consecutive stage.

6. The method of claim 5 wherein the pressure of the driver gas of each consecutive stage is maintained at a higher level than the pressure of the preceding stage.

7. The method of claim 1 including the steps of introducing and exhausting said heated driver gas in stages, such that there is no intermixing of the driver gases of separate stages, the exhaust pressure of said gas in each of said stages being higher than the introduction pressure of said gas in said stage.

8. The method of claim 1 including the step of bringing said preheated reactant gas to rest in said tube means by means of a weak hammershock wave prior to introducing said driver gas therein.

9. The method of claim 1 including the step of holding said reactant gas in its compressed and heated condition for a period of time sufficient to cause a desired chemical synthesis of the reactant gas.

10. The method of claim 1 wherein the step of introducing a preheated reactant gas into the upstream end of a first tube means in said wave reactor comprises the step of introducing preheated dry air into said tube means, and the step of exhausting reactant product gas from the downstream end of said tube means comprises the step of exhausting dry NO and dry depleted air.

11. A method of rapidly heating and cooling a reactant gas to carry out a chemical process including the steps of:
   introducing a first volume of preheated dry reactant gas into the upstream end of a tube;
   introducing a diver gas into the downstream end of said tube at a first inlet passage to compress and heat said reactant gas to cause chemical changes therin;
   exhausting said driver gas from the downstream end of said tube at a second pressure higher than said first inlet pressure while expanding and cooling said chemically changed dry reactant gas;
   exhausting said chemically changed reactant gas from the donwstream end of said tube and introducing a second volume of preheated reactant gas into the upstream end of a second tube; and
   conducting said driver gas exhausted from said first tube into the downstream end of said second tube at a pressure equal to said first inlet pressure to compress and heat said second volume of reactant gas to cause chemical changes therein.

12. A method of rapidly heating and cooling volumes of reactant gas to carry out phase reactions including the steps of:
   positioning a plurality of tube means adjacent the periphery of a rotor means such that the axes of the tubes are parallel the axis of rotation of said rotor means;
   introducing volumes of reactant gas into the upstream ends of said tube means as said tube means rotate past a fixed reactant gas introduction area;
   introducing volumes of driver gas at a first inlet pressure into the downstream ends of said tube means as said tube means rotate past a fixed driver gas introduction area to compress and heat said reactant gas;
   holding said reactant gas in a compressed and heated state for a time adequate to carry out a gas phase reaction in said tube means;
   exhausting volumes of driver gas from the downstream ends of said tube means at a second exhaust pressure higher than said first inlet pressure as said tube means rotate past a fixed driver gas exhaust area;
   conducting said volumes of exhaust driver gas from said driver gas exhaust area to said driver gas introduction area; and
   introducing said volumes of exhausted driver gas into the downstream ends of said tube means at said first inlet pressure as said tube means rotate past said driver gas introduction area.

13. The method of claim 12 including the steps of introducing volumes of driver gas into the downstream ends of said tube means in stages as said tube means rotate past a plurality of fixed driver gas introduction areas;
   exhausting volumes of said driver gas from the downstream ends of said tube means in stages as said tube means rotate past a plurality of fixed driver gas exhaust areas;
   conducting said driver gas exhausted at each discrete exhaust area to a discrete associated introduction area without intermixing with driver gases exhausted at other driver gas exhausted areas; and
   exhausting said driver gas at each driver gas exhaust area at a pressure highter than the pressure of said gas at the associated driver gas introduction areas.

14. A method of rapidly heating and cooling a reactant gas to cause chemical synthesis thereof including the steps of:
   introducing a preheated reactant gas into the upstream end of a first tube means;
   introducing a heated driver gas at a first pressure into the downstream end of said tube means to generate compression waves whereby said reactant gas is heated and compressed to cause chemical synthesis thereof;
   exhausting said driver gas from the downstream end of said tube at a second pressure unequal to said first pressure while expanding and cooling said synthesized reactant gas;
   generating pump work from said reactant gas and applying said pump work to said exhausted driver gas to increase the pressure thereof;
   introducing preheated reactant gas into the upstream end of a second tube means; and
   introducing said exhausted driver gas into the downstream end of said second tube means at a pressure equal to said first pressure.

15. A process for carrying out a gas phase reaction of the type wherein a heated reactant gas is compressed and heated and expanded and cooled in response to the introduction and exhaustion of a driver gas in certain of the tubes of a wave reactor, the improvement comprising exhausting the driver gas from said tubes of the wave reactor at a pressure greater than its entrance pressure into said tubes and recirculating said driver gas to other tubes of said wave reactor without the addition of pump work.

16. The process of claim 15 wherein the heated reactant gas is dry air and the recirculated driver gas is air.

17. The process of claim 15 wherein the heated reactant gas is dry air and the recirculated driver gas is nitrogen.

18. The process of claim 15 wherein the heated reactant gas is dry air and the recirculated driver gas is hydrogen.

19. The process of claim 15 wherein the heated reactant gas is dry air and the recirculated driver gas is steam.

20. A process for carrying out a gas phase reaction of the type wherein a heated reactant gas is compressed and heated and expanded and cooled in response to the introduction and exhaustion of a driver gas in certain of the tubes of a wave reactor, the improvement comprising recirculating the driver gas such that it is reintroduced onto others of the tubes of the wave reactor at a pressure equal to its previous introduction pressure, and employing the reactant gas alone to maintain the pressure of the recirculating driver gas.

21. The process of claim 20 wherein the heated reactant gas is dry air and the recirculated driver gas is air.

22. The process of claim 20 wherein the heated reactant gas is dry air and the recirculated driver gas is nitrogen.

23. The process of claim 20 wherein the heated reactant gas is dry air and the recirculated driver gas is hydrogen.

24. The process of claim 20 wherein the heated reactant gas is dry air and the recirculated driver gas is steam.

25. In an apparatus for carrying out a continuous gas phase reaction of the type including:
- a rotatable reactor having a plurality of open-ended tube means extending parallel the axis of rotation of said reactor;
- means for supplying heated reactant gas at greater than atmospheric pressure to a first end of said tube means, including power source means to pressurize said reactant gas, heat source means to heat said reactant gas, and conduit means and nozzle means directing said reactant gas to said first end of said tube means at inlet positions spaced arcuately about said rotatable reactor;
- reflecting plate means positioned at the first end of said tube means between said arcuately spaced reactant gas inlet positions; and
- nozzle means for supplying driver gas to the second end of said tube means, nozzle means for receiving exhausted driver gas from said second end of said tube means, and nozzle means for receiving processed reactant gas from said second end of said tube means, all said nozzle means being spaced arcuately about said rotatable reactor;
- the improvement comprising conduit means interconnecting nozzle means for supplying driver gas to said tube means and nozzle means for receiving exhausted driver gas from said tube means, said conduit means being a closed system whereby exhausted driver gas from certain of said tube means is circulated directly to others of said tube means.

26. The apparatus of claim 25 including means for generating pump work from said reactant gas and means for applying said pump work to said circulated exhaust driver gas to maintain the entrance pressure of said driver gas into said tube means at a constant level.

27. Apparatus for rapidly heating and cooling a reactant gas to carry out a chemical process including:
- rotatable reactor means including a plurality of tube means axially aligned with the axis of rotation of said reactor means;
- means supplying heated reactant gas to the upstream ends of said tube means as said tube means rotate past a reactant gas supply area;
- means supplying driver gas to the downstream ends of said tube means at a first input pressure as said tube means rotate past a driver gas supply area, to compress and heat said reactant gas to carry out a chemical process;
- means for exhausting said driver gas from the downstream ends of said tube means at a second pressure higher than said first input pressure while expanding and cooling said reactant product gas as said tube means rotate past a driver gas exhaust area;
- means for exhausting said reactant product gas from said tube means as said tube means rotate past a reactant product exhaust area; and,
- conduit means for conducting said driver gas from said driver gas exhaust area to said driver gas supply area.

* * * * *

UNITED STATES PATENT OFFICE
CERTIFICATE OF CORRECTION

Patent No. 3,998,711                         Dated December 21, 1976

Inventor(s)   Abraham Hertzberg and Walter Christiansen

It is certified that error appears in the above-identified patent and that said Letters Patent are hereby corrected as shown below:

Column 3, line 65, change "driven" to -- driver --;
         line 68, change "pressures" to -- pressure --.
Column 5, line 9, change "the" to -- and --.
Column 6, line 28, change "is" to -- it --;
         line 41, after "and" insert -- a --.
Column 7, line 59, after "use" insert -- of hydrogen --.
Column 8, line 3, change "end" to -- ends --.
Column 9, line 62, change "reative" to -- relative --.

line 46, change "intil" to -- until --;
         line 51, change "idea" to -- ideal --.
Column 11, line 15, change "step" to -- sets --;
         line 46, change "desigend" to -- designed --;
         line 54, change "corresponding" to -- correspondingly --.
Column 12, line 20, change "heater" to -- heated --.
Column 13, line 11, change "diver" to -- driver --;
         line 12, change "passage" to -- pressure --;
         line 14, change "therin" to -- therein --;
         line 20, change "donwstream" to -- downstream --;
         line 51, change "exhaust" to -- exhausted --.
Column 14, line 2, change "exhausted" to -- exhaust --;
         line 4, change "highter" to -- higher --;
         line 57, change "onto" to -- into --.

Signed and Sealed this

Twenty-sixth Day of April 1977

[SEAL]

Attest:

RUTH C. MASON
*Attesting Officer*

C. MARSHALL DANN
*Commissioner of Patents and Trademarks*